(12) United States Patent
Annis et al.

(10) Patent No.: US 9,766,415 B2
(45) Date of Patent: Sep. 19, 2017

(54) PANEL MOUNT HEADER CONNECTOR

(71) Applicants: Tyco Electronics Corporation, Berwyn, PA (US); Tyco Electronics Services GmbH, Schaffhausen (CH)

(72) Inventors: Kyle Gary Annis, Hummelstown, PA (US); Matthew Richard McAlonis, Elizabethtown, PA (US); Mitchell Kunane Storry, Harrisburg, PA (US); Richard Barry Crawford, Battle (GB); Mark Roy Dowsett, Coventry (GB); Gareth Leslie Bannister, Eastbourne (GB)

(73) Assignees: TE CONNECTIVITY CORPORATION, Berwyn, PA (US); TYCO ELECTRONICS SERVICES GmbH, Schaffhausen (CH)

( * ) Notice: Subject to any disclaimer, the term of this patent is extended or adjusted under 35 U.S.C. 154(b) by 85 days.

(21) Appl. No.: 14/537,049

(22) Filed: Nov. 10, 2014

(65) Prior Publication Data
US 2016/0131856 A1 May 12, 2016

(51) Int. Cl.
*G02B 6/38* (2006.01)
*H01R 13/74* (2006.01)

(52) U.S. Cl.
CPC ......... *G02B 6/3893* (2013.01); *H01R 13/743* (2013.01)

(58) Field of Classification Search
CPC .......................... H01R 13/743; G02B 6/3893
See application file for complete search history.

(56) References Cited

U.S. PATENT DOCUMENTS

| 2,891,103 | A |   | 6/1959  | Swengel |
|-----------|---|---|---------|---------|
| 3,573,716 | A | * | 4/1971  | Garver ................. H01R 13/743 439/353 |
| 3,989,343 | A | * | 11/1976 | Lucius ................. H01R 13/743 248/27.3 |
| 7,494,374 | B2 |  | 2/2009  | Hall et al. |
| 7,789,701 | B2 |  | 9/2010  | Murr et al. |

(Continued)

FOREIGN PATENT DOCUMENTS

| DE | 197 55 939 A1 | 6/1998  |
|----|---------------|---------|
| EP | 0 883 213 A2  | 12/1998 |

(Continued)

OTHER PUBLICATIONS

European Search Report, Mail Date, Mar. 30, 2016, EP 15 19 2692, Application No. 15192692.0-1801.

*Primary Examiner* — Ryan Lepisto
*Assistant Examiner* — Erin Chiem

(57) ABSTRACT

A panel-mountable header connector includes conductors and a housing. The housing holds the conductors in a cavity of the housing. The housing has a front end and a rear end. The housing has a latch set and a stop feature which define a panel mounting zone therebetween. The panel mounting zone is configured to align with an opening in a panel when the housing is mounted to the panel. The latch set is configured to engage a front side of the panel, and the stop feature is configured to engage a rear side of the panel to retain the panel in the panel mounting zone. At least one of the latch set or the stop feature is stepped such that a width of the panel mounting zone is variable to accommodate the panel having one of multiple thicknesses.

20 Claims, 6 Drawing Sheets

(56) References Cited

U.S. PATENT DOCUMENTS

2002/0058440 A1* 5/2002 Ishikawa .............. H01R 13/743
439/557
2010/0130059 A1 5/2010 Lee et al.

FOREIGN PATENT DOCUMENTS

JP  2011 082055 A  4/2011
WO  2012/176939 A1  12/2012

* cited by examiner

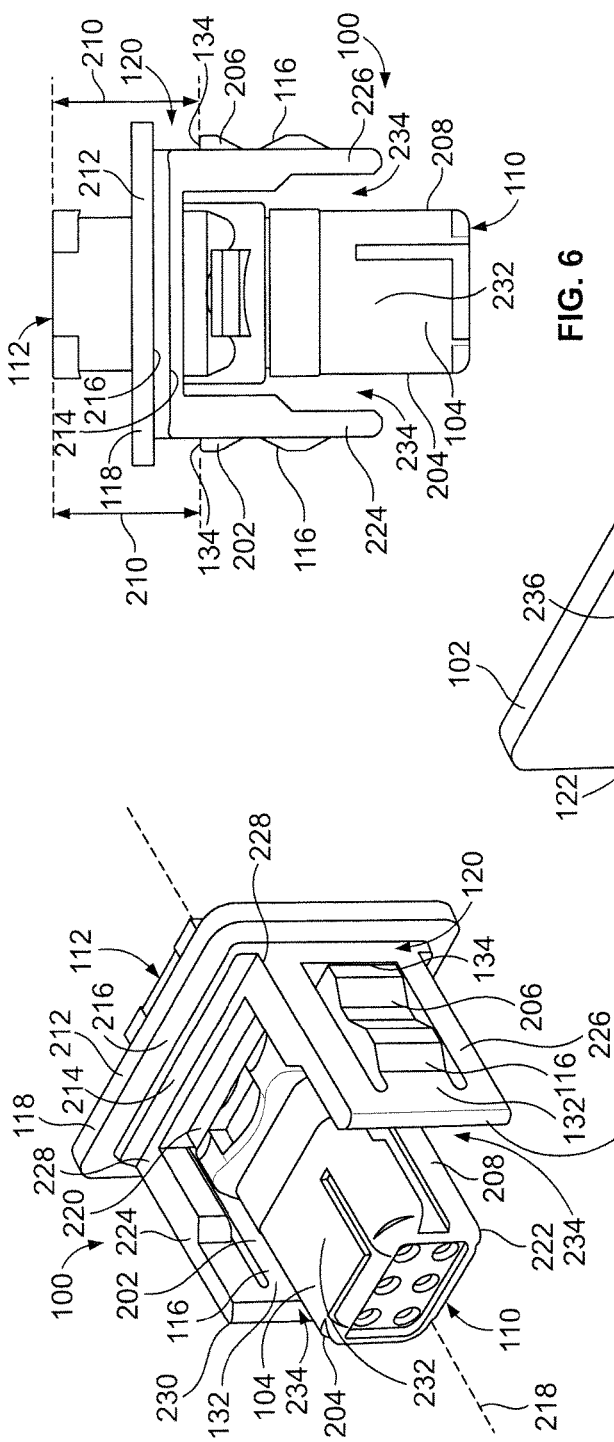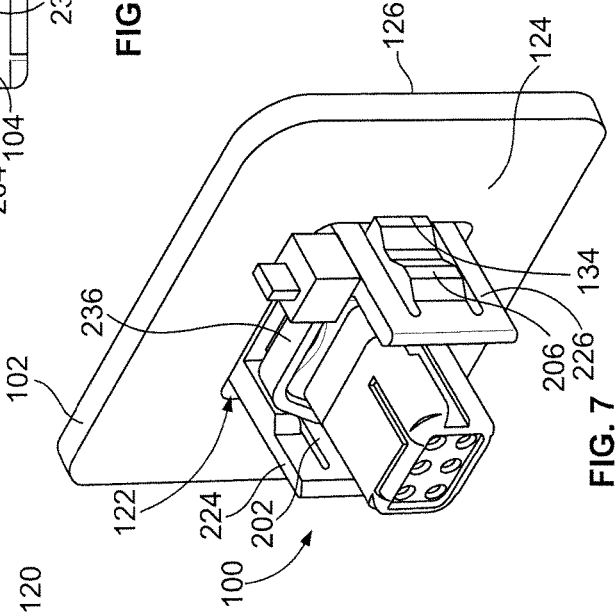

PANEL MOUNT HEADER CONNECTOR

BACKGROUND OF THE INVENTION

The subject matter herein relates generally to header connectors that are configured to mount to panels.

Some header connectors are designed to mount to a panel to provide an electrical and/or optical connection across the panel. For example, the panel may be a wall of an electrical device. The panel-mountable header connector is configured to extend at least partially through an opening in the panel and is secured to the panel. The panel-mountable header connectors are typically designed to accommodate only one panel thickness or a very narrow range of panel thicknesses. Typically, the opening in the panel may be cut to fit various sizes of connectors. However, it is much more difficult and expensive to alter a thickness of the panel to attain a thickness that a desired header connector is designed to accommodate. Generally, to accommodate various panel thicknesses, a specific header connector is chosen from multiple different header connectors having the same mating interface, where each of the connectors is designed to accommodate a different thickness of panel. A need remains for a panel-mountable header connector that is configured to accommodate a broader range of panel thicknesses to avoid the need to determine which of multiple header connectors properly couples to a given panel.

In addition, due to the trend of increasing signal density (or amount of electrical and/or optical connections per area) in electrical and/or optical systems, a need remains for reducing the surface area or footprint of the header connector on the panel in order to increase the number of panel-mount header connectors that may be installed in a given area of a panel.

BRIEF DESCRIPTION OF THE INVENTION

In an embodiment, a panel-mountable header connector includes conductors and a housing. The conductors are configured to transmit at least one of electrical signals or optical signals. The housing holds the conductors in a cavity of the housing. The housing has a front end and a rear end. The housing has a latch set and a stop feature. The latch set and the stop feature define a panel mounting zone therebetween. The panel mounting zone is configured to align with an opening in a panel when the housing is mounted to the panel. The latch set is configured to engage a front side of the panel, and the stop feature is configured to engage a rear side of the panel to retain the panel in the panel mounting zone. At least one of the latch set or the stop feature is stepped such that a width of the panel mounting zone is variable to accommodate the panel having one of multiple thicknesses.

In another embodiment, a panel-mountable header connector includes conductors and a housing. The conductors are configured to transmit at least one of electrical signals or optical signals. The housing holds the conductors in a cavity of the housing. The housing has a front end and a rear end. The housing defines a panel mounting zone configured to align with an opening in a panel when the housing is mounted to the panel. The housing has multiple latches including at least one wide panel latch and at least one narrow panel latch. The latches extend from an outer surface of the housing between the panel mounting zone and the front end of the housing. A free end of the at least one narrow panel latch is disposed more proximate to the rear end of the housing than a free end of the at least one wide panel latch. Based on a thickness of the panel, the free end of the at least one narrow panel latch or the free end of the at least one wide panel latch is configured to engage a front side of the panel to retain the panel in the panel mounting zone.

In an embodiment, a panel-mountable header connector includes conductors and a housing. The conductors are configured to transmit at least one of electrical signals or optical signals. The housing holds the conductors in a cavity of the housing. The housing has a front end and a rear end. The housing defines a panel mounting zone configured to align with an opening in a panel when the housing is mounted to the panel. The housing has a stepped flange disposed between the panel mounting zone and the rear end of the housing. The stepped flange includes at least a first ledge and a second ledge stepped from the first ledge. The second ledge is disposed more proximate to the rear end of the housing than the first ledge. Based on a thickness of the panel, the first ledge or the second ledge is configured to engage a rear side of the panel to retain the panel in the panel mounting zone.

BRIEF DESCRIPTION OF THE DRAWINGS

FIG. 5 is a perspective view of the panel mount header connector according to another embodiment.

FIG. 6 is a top view of the panel mount header connector shown in FIG. 5.

FIG. 7 is a perspective view of the panel mount header connector shown in FIGS. 5 and 6 mounted to a panel.

DETAILED DESCRIPTION OF THE INVENTION

Figure 1:
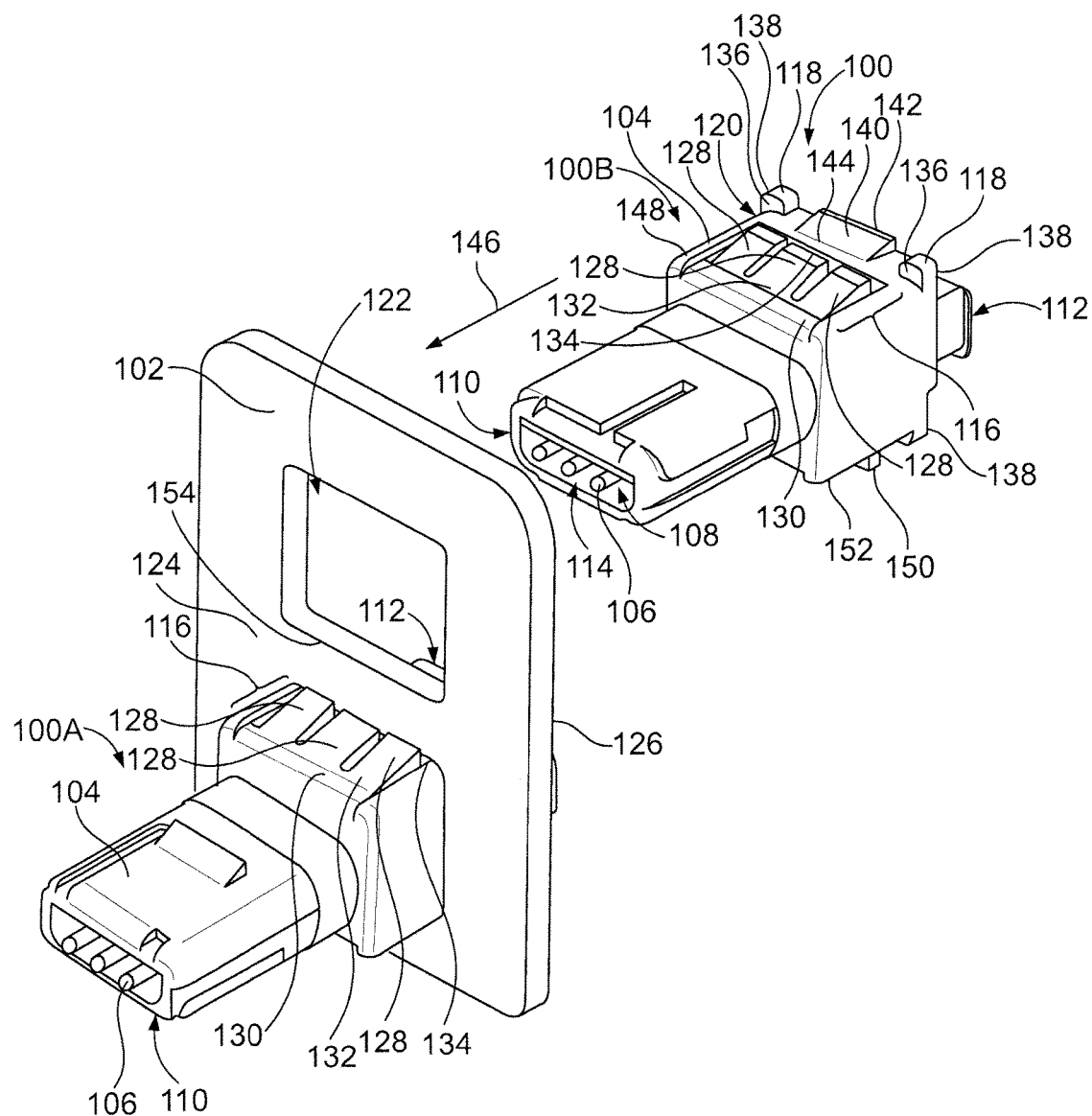
FIG. 1 is a perspective view of two panel mount header connectors according to an embodiment.

FIG. 1 is a perspective view of two panel mount header connectors 100 according to an embodiment. A first panel mount header connector 100A is shown mounted to a panel 102 and a second panel mount header connector 102B is shown poised for mounting to the panel 102. The first and second panel mount header connectors 102A, 102B may have the same or at least similar features, sizes, and shapes, such that the following description of a panel mount header connector 100 applies to both connectors 102A and 102B. As used herein, the panel mount header connector 100 may be referred to as panel-mountable header connector 100, header connector 100, or connector 100.

The header connector 100 includes a housing 104 and conductors 106. The conductors 106 may be optical fibers that convey optical signals and/or electrical contacts that convey electrical signals. For example, the header connector 100 may be a fiber optic connector, an electrical connector, or a connector that includes both optical conductors and electrical conductors. The housing 104 holds the conductors 106 in a cavity 108 defined within the housing 104. The housing 104 has a front end 110 and a rear end 112 opposite the front end 110. The front end 110 defines a mating interface including an opening 114 to the cavity 108. The mating interface is configured to couple to a mating connector (not shown) to electrically and/or optically connect the conductors 106 to mating conductors (not shown) of the mating connector. For example, the header connector 100 may be a plug that is configured to couple to a receptacle mating connector. Alternatively, the header connector 100 may be a receptacle that is configured to couple to a plug mating connector. The conductors 106 may be pin contacts or receptacle contacts that are configured to receive pin contacts. The rear end 112 of the header connector 100 may be terminated to one or more electrical or optical cables, wires, circuit boards, or the like.

The header connector 100 includes a latch set 116 and a stop feature 118. The latch set 116 and the stop feature 118 define a panel mounting zone 120 therebetween. The panel mounting zone 120 is configured to align with an opening 122 in the panel 102 when the housing 104 is properly mounted to the panel 102. In an embodiment, the latch set 116 is located between the stop feature 118 and the front end 110 of the housing 104, and the stop feature 118 is located between the latch set 116 and the rear end 112 of the housing 104. When the opening 122 of the panel 102 is aligned with the panel mounting zone 120, the latch set 116 is to the front of the panel 102 and the stop feature 118 is to the rear of the panel 102. The latch set 116 is configured to engage a front side 124 of the panel 102 and the stop feature 118 is configured to engage a rear side 126 of the panel 102 in order to hold or retain the panel 102 in the panel mounting zone 120. For example, the latch set 116 may block relative movement between the panel 102 and the housing 104 that causes the panel 102 to move out of the panel mounting zone 120 towards the front end 110 of the housing 104, and the stop feature 118 may block relative movement that causes the panel 102 to move out of the panel mounting zone 120 towards the rear end 112. In an exemplary embodiment, at least one of the latch set 116 or the stop feature 118 are stepped such that a width of the panel mounting zone 120 is variable to accommodate the panel 102 having different thicknesses. As a result, the header connector 100 is configured to mount properly to multiple different panel thicknesses, avoiding the need for manufacturing and/or purchasing multiple connectors that are each configured to mount to different panel thicknesses or different narrow ranges of panel thicknesses.

The panel 102 may be a wall of an electrical device (not shown), a wall of a container that holds one or more devices therein, or a wall of another structure. The front side 124 of the panel 102 may be oriented towards an exterior of the device or container, and the rear side 126 may be oriented towards an interior of the device or container. Alternatively, the front side 124 is oriented towards the interior of the device or container, and the rear side 126 is oriented towards the exterior. As used herein, relative or spatial terms such as "upper," "lower," "front," "rear," "top," "bottom," "left," and "right" are only used to distinguish the referenced elements and do not necessarily require particular positions or orientations in the panel mount header connector 100 relative to gravity or relative to the surrounding environment of the panel mount header connector 100, such as relative to the device or container that includes the panel 102.

The latch set 116 includes multiple latches 128 that extend from an outer surface 130 of the housing 104. The latches 128 are cantilevered such that each have a fixed end 132 at the outer surface 130 and a free end 134 that is not attached to the outer surface 130. In an embodiment, the free ends 134 of the latches 128 define a front edge of the panel mounting zone 120 (for example, the edge of the panel mounting zone 120 proximate to the front end 110 of the housing 104). The latches 128 of the latch set 116 may be located on a common side of the housing 104 or on different sides of the housing 104. In addition, the housing 104 may include multiple latch sets 116.

The stop feature 118 protrudes from the outer surface 130 of the housing 104. The stop feature 118 may include one or more components that define a front wall 136 that is configured to engage the rear side 126 of the panel 102. For example, the front wall 136 defines a rear edge of the panel mounting zone 120 (for example, the edge of the panel mounting zone 120 proximate to the rear end 112 of the housing 104). In the illustrated embodiment, the stop feature 118 includes multiple lugs 138 disposed at corners of the housing 104. In alternative embodiments, the stop feature 118 may include only one lug 138, one or more wings (not shown), a flange, and/or the like.

In an embodiment, the housing 104 further includes a ramp 140 that escalates gradually from the outer surface 130 in the panel mounting zone 120 towards the rear end 112 of the housing 104. The ramp 140 is sloped such that an apex 142 of the ramp 140 is disposed more proximate to the rear end 112 of the housing 104 than a base 144 of the ramp 140 (for example, where the ramp 140 protrudes from the outer surface 130). The base 144 of the ramp 140 may be located in the panel mounting zone 120 between the free ends 134 of the latches 128 and the front wall 136 of the stop feature 118. The ramp 140 may be at least partially deflectable. For example, the ramp 140 may be configured to apply a biasing force on the panel 102 towards the latches 128 of the latch set 116, as shown below with reference to FIGS. 3A-3C.

In an embodiment, the housing 104 is mounted to the panel 102 by inserting the housing 104, front end 110 first, through the opening 122 of the panel 102 in a loading direction 146 from the rear side 126 of the panel 102 to the front side 124 of the panel 102. As shown in FIG. 1, the first panel mount header connector 100A is mounted to the panel 102, while the second panel mount header connector 100B is poised for mounting to the panel 102 through the opening 122 above the first header connector 100A. Since the front end 110 extends through the opening 122 first and the latch set 116 is disposed between the front end 110 and the panel mounting zone 120, the latches 128 of the latch set 116 are moved through the opening 122 to allow the panel mounting zone 120 to align with the panel 102. The latches 128 are configured to engage an edge of the panel 102 and to deflect inwards (towards the inner cavity 108 of the housing 104) as the latches 128 are inserted through the opening 122. The deflected latches 128 are biased such that the latches 128 undeflect once the free end 134 of the corresponding latch 128 moves beyond the front side 124 of the panel 102 and the deflecting force applied by the panel 102 on the latch 128 is removed.

Optionally, the header connector 100 may include one latch set 116 on a first side 148 of the housing 104 and a shelf 150 extending from an opposite, second side 152 of the housing 104. The first side 148 of the header connector 100B shown in FIG. 1 is a top side, and the second side 152 of the header connector 100B is a bottom side. The shelf 150 may be a ridge that extends laterally at least partially across a width of the housing 104. The shelf 150 is configured to hook around the opening 122 of the panel 102 as the housing 104 is inserted into the opening 122 to allow the housing 104 to pivot about the shelf 150. For example, the shelf 150 may be inserted through the opening 122 from the rear side 126, but engages a front edge 154 of the opening 122 at the front side 124 to allow the housing 104 to pivot about the front edge 154 as the housing 104 is loaded through the opening 122. In an alternative embodiment, the housing 104 may include a latch set 116 on each of the first side 148 and the second side 152 instead of including a shelf 150.

Figure 2:
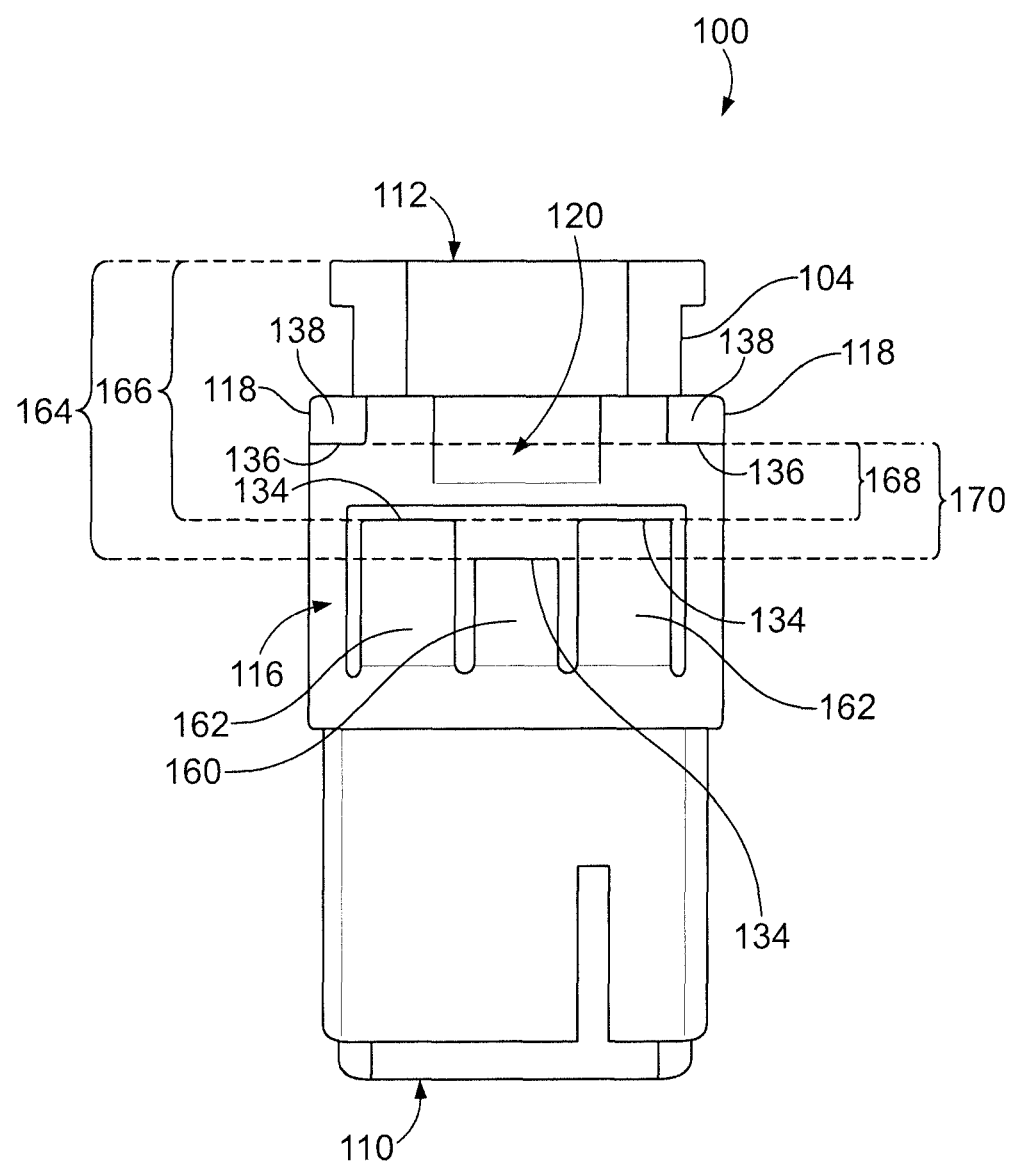
FIG. 2 is a top view of the panel mount header connector according to an embodiment.

FIG. 2 is a top view of the panel mount header connector 100 according to an embodiment. The latch set 116 includes at least one wide panel latch 160 and at least one narrow panel latch 162. As used herein, "wide panel latch" and "narrow panel latch" do not describe or limit the sizes and/or shapes of the latches themselves, but rather identifies and contrasts characteristics of the panels that the respective latches are configured to engage. For example, the wide panel latch 160 is configured to engage a panel that is wider or thicker than a panel that the narrow panel latch 162 is configured to engage. In addition, the wide panel latch 160 may be wider than, the same width as, or narrower than the narrow panel latch 162.

The free end 134 of each wide panel latch 160 is disposed at a different location relative to the rear end 112 of the housing 104 than the free end 134 of each narrow panel latch 162. For example, the free end 134 of each wide panel latch 160 is a first distance 164 from the rear end 112, while the free end 134 of each narrow panel latch 162 is a second distance 166 from the rear end 112. The second distance 166 is shorter than the first distance 164, so the free end 134 of each narrow panel latch 162 is more proximate to the rear end 112 than the free end 134 of each wide panel latch 160. Thus, the latch set 116 is stepped because the free ends 134 of at least two of the latches 160, 162 in the latch set 116 are at staggered distances from the rear end 112 of the housing 104. In an embodiment, the free end 134 of either the at least one wide panel latch 160 or the at least one narrow panel latch 162, but not both, is configured to engage the front side 124 (shown in FIG. 1) of the panel 102 (FIG. 1) to retain the panel 102 in the panel mounting zone 120. Whether the at least one wide panel latch 160 or the at least one narrow panel latch 162 engages the front side 124 of the panel 102 depends on a thickness of the panel 102.

In the illustrated embodiment, the latch set 116 includes two narrow panel latches 162 and one wide panel latch 160 disposed laterally between the two narrow panel latches 162. The latches 160, 162 are disposed side-by-side and extend parallel to each other. Thus, the latches 160, 162 alternate in a lateral direction across a width of the header connector 100. In other embodiments, the latch set 116 may include different numbers of wide panel latches 160 and/or narrow panel latches 162, such as only two or more than three total latches, and/or different arrangements or orientations of the latches.

The stop feature 118 includes two lugs 138. The front walls 136 of the lugs 138 are an equal distance from the rear end 112 and define a constant rear edge of the panel mounting zone 120. On the other hand, the latch set 116 is stepped and defines multiple front edges of the panel mounting zone 120. Thus, the panel mounting zone 120 has multiple widths in order to accommodate a panel 102 (shown in FIG. 1) having one of multiple thicknesses. For example, the panel mounting zone 120 defined between the free ends 134 of the narrow panel latches 162 and the front walls 136 of the lugs 138 has a first width 168. The panel mounting zone 120 defined between the free end 134 of the wide panel latch 160 and the front walls 136 has a second width 170 that is wider than the first width 168. Therefore, a narrow panel 102 may align with the first width 168 of the panel mounting zone 120 between the narrow panel latches 162 and the lugs 138, where the free ends 134 of the narrow panel latches 162 engage the front side 124 (shown in FIG. 1) of the panel 102. On the other hand, a wider panel 102 may align with the second, wider width 170 of the panel mounting zone 120 between the wide panel latch 160 and the lugs 138, where the free end 134 of the wide panel latch 160 engages the front side 124 of the panel 102. In an alternative embodiment, instead of having two different latches—a wide panel latch 160 and a narrow panel latch 162—the header connector 100 may have three or more latches that have free ends at varying distances from the stop feature 118 and/or the rear end 112 in order to define a panel mounting zone 120 having at least three widths to accommodate three or more different panel thicknesses.

Figure 3A:
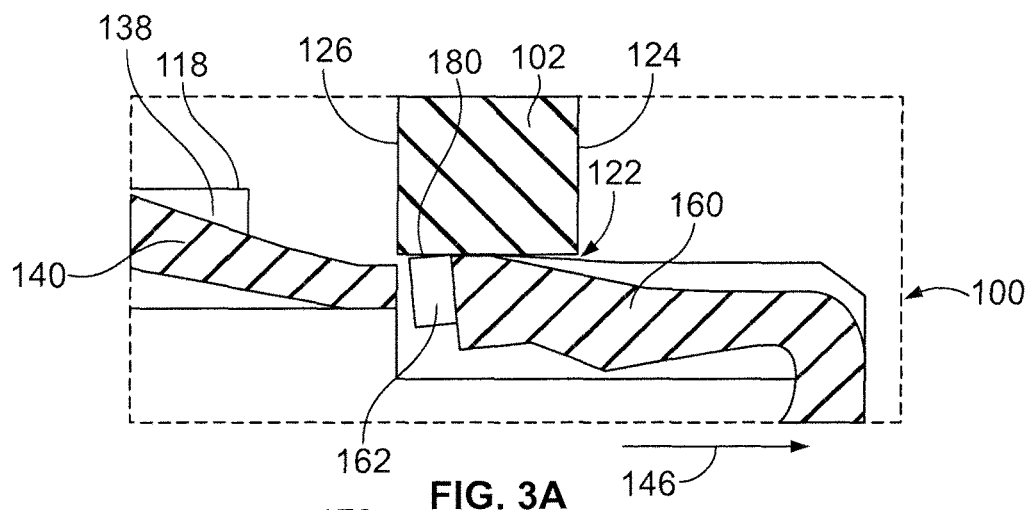
FIGS. 3A-3C illustrate side cross-sections of a portion of the panel mount header connector at various positions relative to the panel according to an embodiment.
Figure 3B:
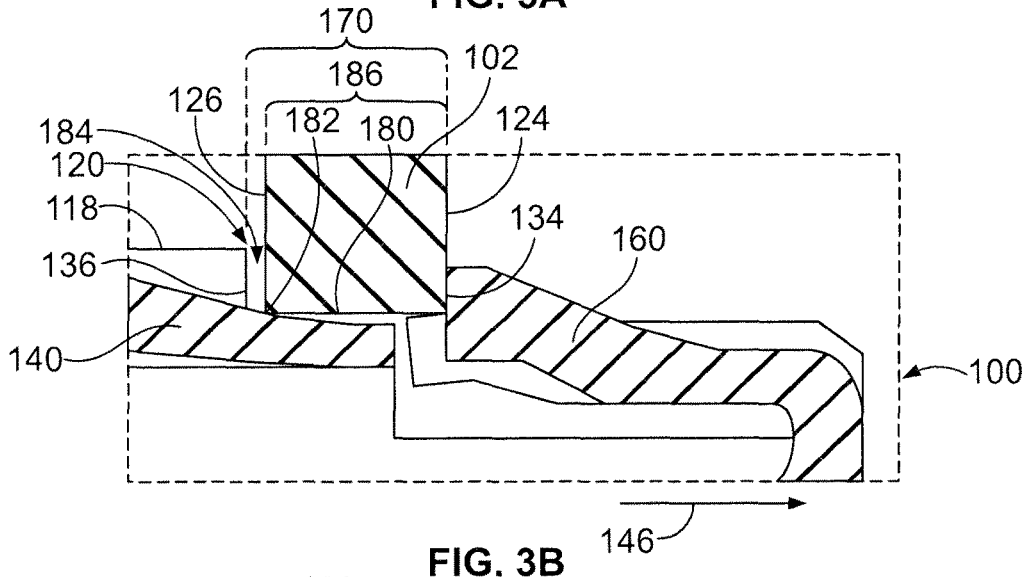
Figure 3C:
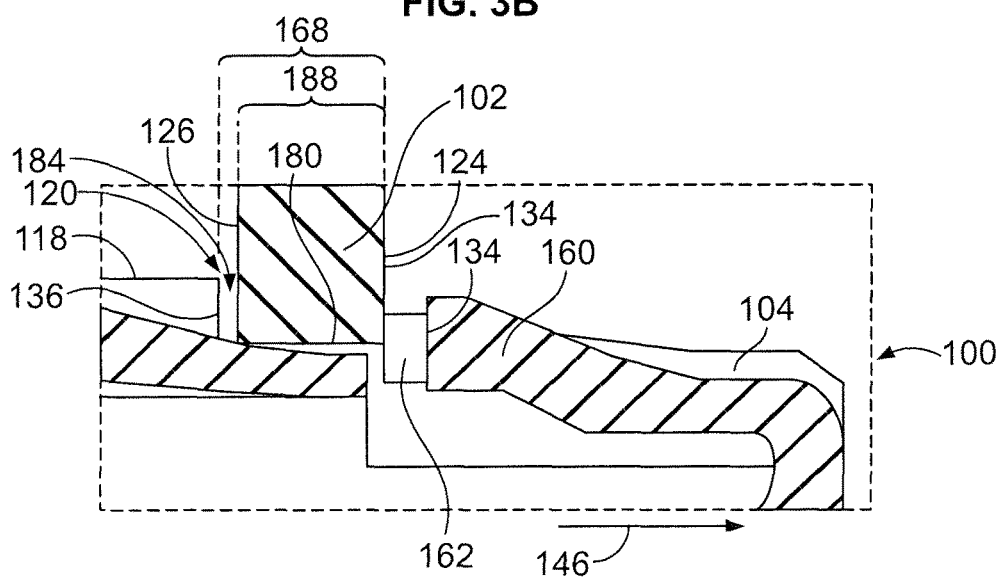

FIGS. 3A-3C illustrate side cross-sections of a portion of the panel mount header connector 100 at various positions relative to the panel 102 according to an embodiment. The cross-section is taken through the wide panel latch 160 and the ramp 140. A stop feature 118 (such as the lug 138) is shown behind the ramp 140, and a narrow panel latch 162 is shown behind the wide panel latch 160.

In FIG. 3A, the header connector 100 is being inserted in the loading direction 146 through the opening 122 in the panel 102. An inner wall 180 of the panel 102 between the front side 124 and the rear side 126 engages the wide panel latch 160 and the narrow panel latch 162, causing the latches 160, 162 to deflect inward. Thus, the latches 160, 162 are shown in a deflected state. The ramp 140 is spaced apart from the panel 102 such that the ramp 140 does not engage the panel 102. The ramp 140 is undeflected in FIG. 3A.

In FIG. 3B, the panel 102 is in the panel mounting zone 120 of the header connector 100. The free end 134 of the wide panel latch 160 has moved in the loading direction 146 beyond the front side 124 of the panel 102, so the deflecting force applied on the wide panel latch 160 by the inner wall 180 is removed. The wide panel latch 160 is biased towards an undeflected state, so the wide panel latch 160 in FIG. 3B is in the undeflected state. A rear edge 182 of the panel 102 is the intersection between the rear side 126 and the inner wall 180. When the panel 102 is in the panel mounting zone 120, the rear edge 182 engages the ramp 140. The rear edge 182 may cause the ramp 140 to deflect at least partially inwards. Compared to FIG. 3A, the ramp 140 in FIG. 3B has a reduced slope due to deflection of the ramp 140. The ramp 140 is biased in an undeflected state, so the ramp 140 applies a biasing force against the rear edge 182 of the panel 102 in a direction at least partially towards the free end 134 of the wide panel latch 160. For example, the biasing force exerted by the ramp 140 may hold the front side 124 of the panel 102 in constant engagement with the free end 134 of the wide panel latch 160. The panel 102 may be sandwiched between the ramp 140 and the wide panel latch 160, which reduces the amount of relative movement (for example, rattling, vibration, etc.) between the panel 102 and the header connector 100. The front wall 136 of the stop feature 118 is spaced apart from the rear side 126 of the panel 102 by a small gap or tolerance 184. The stop feature 118 provides a hard stop that engages the rear side 126 to retain the panel 102 in the panel mounting zone 120 only when sufficient force is applied to the panel 102 or the connector 100 such that the rear edge 182 of the panel 102 deflects the ramp 140 to an extent that the gap 184 between the stop feature 118 and the panel 102 is eliminated.

The panel 102 shown in FIG. 3B has a wide thickness 186. For example, the panel 102 is sufficiently wide that the free end 134 of the narrow panel latch 162 does not move past the inner wall 180 of the panel 102 as the header connector 100 is loaded before the ramp 140 and/or the stop feature 118 prevent further movement of the connector 100 in the loading direction 146 relative to the panel 102. The free end 134 of the narrow panel latch 162 remains deflected and in engagement with the inner wall 180 when the panel 102 has the wide thickness 186. As such, the free end 134 of the narrow panel latch 162 does not engage the front side 124 of the panel 102 and is not used to retain the panel 102 in the panel mounting zone 120. The panel mounting zone 120 shown in FIG. 3B has the width 170 that is defined between the front wall 136 of the stop feature 118 and the free end 134 of the wide panel latch 160.

Referring now to FIG. 3C, the panel 102 is in the panel mounting zone 120 of the header connector 100 similar to FIG. 3B, but, unlike FIG. 3B, the panel 102 in FIG. 3C has a narrow thickness 188. Since the panel 102 is narrower than the panel 102 in FIG. 3B, the free ends 134 of both the wide panel latch 160 and the narrow panel latch 162 move past or beyond the inner wall 180 of the panel 102 as the connector 100 is inserted through the panel 102 in the loading direction 146. As a result, once the deflecting force of the panel 102 is removed, both the wide panel latch 160 and the narrow panel latch 162 transition to the undeflected state when the panel 102 aligns with the panel mounting zone 120. Since the free end 134 of the narrow panel latch 162 is disposed more proximate to the rear end 112 (shown in FIG. 2) of the housing 104, only the free end 134 of the narrow panel latch 162 engages the front side 124 of the panel 102 to retain the panel 102 in the panel mounting zone 120. For example, the free end 134 of the wide panel latch 160 is spaced apart from the panel 102 and does not engage the front side 124. The panel mounting zone 120 shown in FIG. 3C has the width 168 that is defined between the front wall 136 of the stop feature 118 and the free end 134 of the narrow panel latch 162.

It is understood that the width 170 of the panel mounting zone 120 between the stop feature 118 and the wide panel latch 160 shown in FIG. 3B may be configured to accommodate a range of panel thicknesses and not only one specific and limited thickness. In addition, the width 168 of the panel mounting zone 120 between the stop feature 118 and the narrow panel latch 162 shown in FIG. 3C may be configured to accommodate a range of panel thicknesses and not only one specific and limited thickness. For example, due to the biasing of the ramp 140 on the panel 102 and the gap 184 that may form between the rear side 126 of the panel 102 and the stop feature 118, a range of panel thicknesses may be accommodated in each width 168, 170 of the panel mounting zone 120. Therefore, a range of wide panel thicknesses may be accommodated between the stop feature 118 and the wide panel latch 160, and a different range of narrow panel thicknesses may be accommodated between the stop feature 118 and the narrow panel latch 162. The thicknesses in the range of wide panel thicknesses may be greater than the thicknesses in the range of narrow panel thicknesses.

Figure 4:
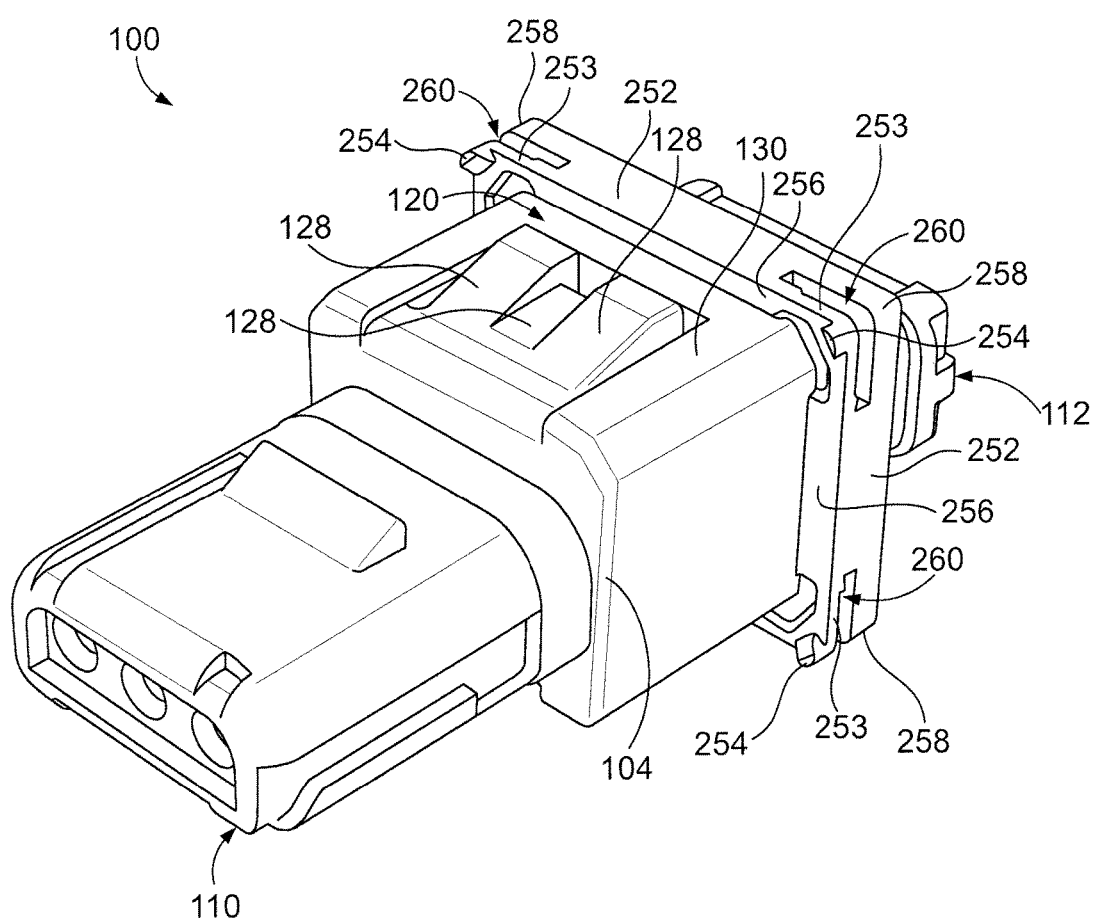
FIG. 4 is a perspective view of the panel mount header connector according to another embodiment.

FIG. 4 is a perspective view of the panel mount header connector 100 according to another embodiment. In the illustrated embodiment, the latches 128 may be similar to the latches 128 shown in FIG. 1. The stop feature is a flange 252. The flange 252 extends from the outer surface 130 of the housing 104. The flange 252 includes at least one biasing segment 253 along a front wall 256 of the flange 252. In the illustrated embodiment, the flange 252 includes biasing segments 253 at corners 258 of the flange 252. Each biasing segment 253 may include a lug 254 that protrudes from the front wall 256. Alternatively, instead of a protruding lug, the front wall 256 at the biasing segment 253 may define a flap that is angled towards the front end 110 of the housing 104 relative to portions of the front wall 256 away from of the biasing segments 253. The at least one biasing segment 253 of the flange 252 defines at least one aperture 260 that is axially rearward (for example, towards the rear end 112) of the front wall 256. For example, the at least one aperture 260 may be multiple apertures 260 that are each disposed along a different corner 258 of the flange 252 or may be a single aperture that extends along the entire perimeter of the flange 252. In the illustrated embodiment, the lugs 254 are at least partially deflectable and are configured to flex rearward at least partially into the at least one aperture 260. When the connector 100 is mounted to the panel 102 (shown in FIG. 1), the lugs 254 are configured to engage the rear side 126 (FIG. 1) of the panel 102 and to deflect at least partially into the at least one aperture 260 to apply a biasing force on the panel 102 towards the latches 128. Due to the amount of deflection of the lugs 254, the rear edge of the panel mounting zone 120 is defined by the lugs 254 or the front wall 256 of the flange 252. For example, the lugs 254 provide a variable stop and the front wall 256 provides a hard stop. The front wall 256 defines the rear edge of the panel mounting zone 120 if the lugs 254 deflect rearward beyond the plane of the front wall 256. In the alternative embodiment in which the front walls 256 at the biasing segments 253 form flaps instead of having lugs, the flaps may engage the rear side 126 of the panel 102 and deflect at least partially into the at least one aperture 260 to apply the biasing force on the panel 102.

FIG. 5 is a perspective view of the panel mount header connector 100 according to another embodiment. FIG. 6 is a top view of the panel mount header connector 100 shown in FIG. 5. FIG. 7 is a perspective view of the panel mount header connector 100 shown in FIGS. 5 and 6 mounted to a panel 102. The header connector 100 shown in FIGS. 5-7 defines the panel mounting zone 120 between the latch set 116 and the stop feature 118, like the header connector 100 shown in FIG. 1. In FIGS. 5-7, the latch set 116 includes at least a first latch 202 that extends from a left side 204 of the housing 104 and a second latch 206 that extends from a right side 208 of the housing 104. Free ends 134 of the first and second latches 202, 206 are configured to engage a front side 124 of the panel 102. As shown in FIG. 6, the free ends 134 of the first and second latches 202, 206 are disposed an equal distance 210 from the rear end 112 of the housing 104, and define a constant front edge of the panel mounting zone 120.

In an embodiment, the stop feature 118 is stepped to define multiple widths of the panel mounting zone 120 to accommodate the panel 102 having one of multiple panel thicknesses. For example, the stop feature 118 may be a stepped flange 212 that has at least a first ledge 214 and a second ledge 216. The second ledge 216 is stepped from the first ledge 214 such that the second ledge 216 is disposed more proximate to the rear end 112 of the housing 104 than the first ledge 214. Depending on the thickness of the panel 102, the first ledge 214 or the second ledge 216 is configured to engage the rear side 126 of the panel 102 to retain the panel 102 in the panel mounting zone 120. Therefore, the stepped flange 212 defines a variable rear edge of the panel mounting zone 120. The first ledge 214 is more proximate to the free ends 134 of the latches 202, 206 along a longitudinal axis 218 of the header connector 100 than the second ledge 216. The first ledge 214 defines a narrow width of the panel mounting zone 120 for accommodating panels having narrow thicknesses. The second ledge 216 defines a wide width of the panel mounting zone 120 for accommodating panels having wide thicknesses (relative to the narrow panels accommodated by the narrow width of the panel mounting zone 120). In an embodiment, the latches 202, 206 extend from the left and right sides 204, 208, respectively, of the housing 104, and the stepped flange 212 extends from a top side 220 and a bottom side 222 of the housing 104.

Optionally, the housing 104 may include left and right arms 224, 226 that extend from the left and right sides 204, 208, respectively, of the housing 104. The left and right arms 224 extend generally towards the front end 110 such that a fixed end 228 of each of the arms 224, 226 is more proximate to the rear end 112 and a free end 230 of each of the arms 224, 226 is more proximate to the front end 110. The left latch 202 extends from the left arm 224, and the right latch 206 extends from the right arm 226. The free ends 134 of the latches 202, 206 are disposed more proximate to the rear end 112 than the fixed ends 132. The free end 134 of the left latch 202 extends outward to the left from the left arm 224, and, similarly, the free end 134 of the right latch 206 extends outward to the right from the right arm 226. The left and right arms 224, 226 are separated from a body 232 of the housing 104, which defines the cavity 108 (shown in FIG. 1) and holds the conductors 106 (FIG. 1), by slots 234. As the header connector 100 is mounted to the panel 102, the left and right arms 224, 226 (including the left and right latches 202, 206 thereon) are inserted through the opening 122 in the panel 102. The latches 202, 206 and/or the arms 224, 226 deflect at least partially inwards towards the body 232, reducing the size of the slots 234, due to interference between inner surfaces of the panel 102 with the latches 202, 206 and/or the arms 224, 226. Once the free ends 134 of the latches 202, 206 move beyond the front side 124 of the panel 102, the deflecting force is removed, and the latches 202, 206 and/or the arms 224, 226 return to an undeflected state. In the undeflected state, the free ends 134 are configured to engage the front side 124 to retain the panel 102 in the panel mounting zone 120.

Optionally, once the header connector 100 is mounted to the panel 102, a latch reinforcement band 236 may be inserted into the slots 234 between the body 232 and the left and right arms 224, 226. The latch reinforcement band 236 may be a pre-formed component or a wrapped component, such as a cable tie. The latch reinforcement band 236 is configured to mechanically block the arms 224, 226 and/or the latches 202, 206 on the arms 224, 226 from deflecting inwards into the slots 234. For example, the latch reinforcement band 236 may prevent the arms 224, 226 and/or latches 202, 206 from deflecting to an extent that allows the free ends 134 of the latches 202, 206 to disengage from the front side 124 and enter the opening 122 of the panel 102, which uncouples the header connector 100 from the panel 102. Thus, the latch reinforcement band 236 may prevent or at least prohibit unintentional removal of the header connector 100 from the panel 102.

Figure 8A:
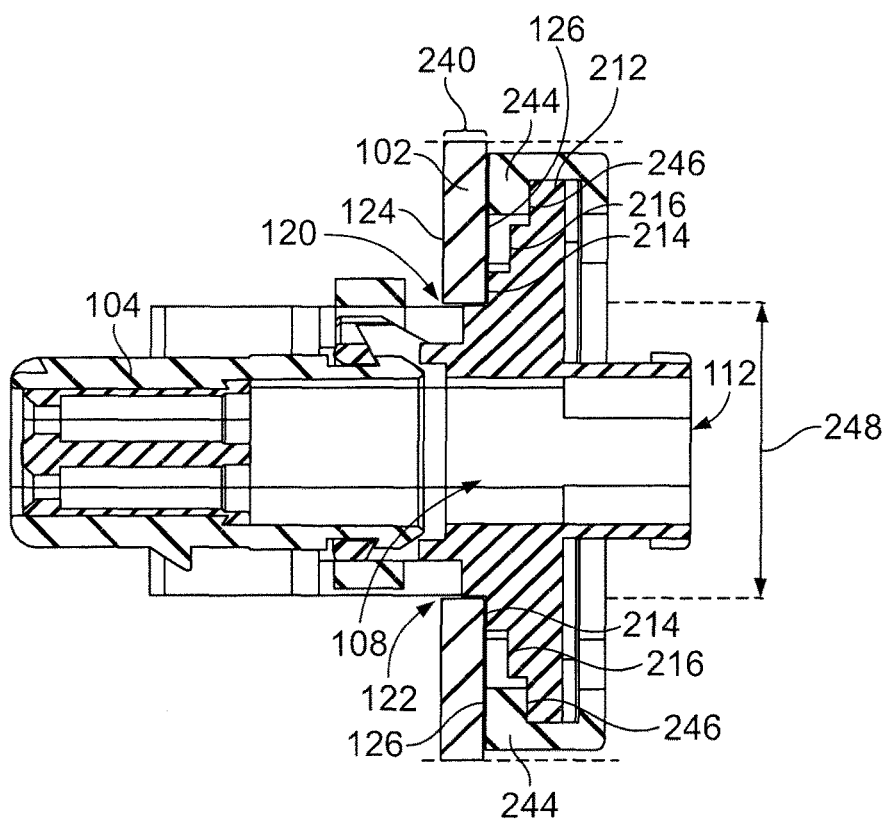
FIGS. 8A and 8B are side cross-sectional views of the header connector shown in FIGS. 5-7 mounted to panels of two different thicknesses.
Figure 8B:
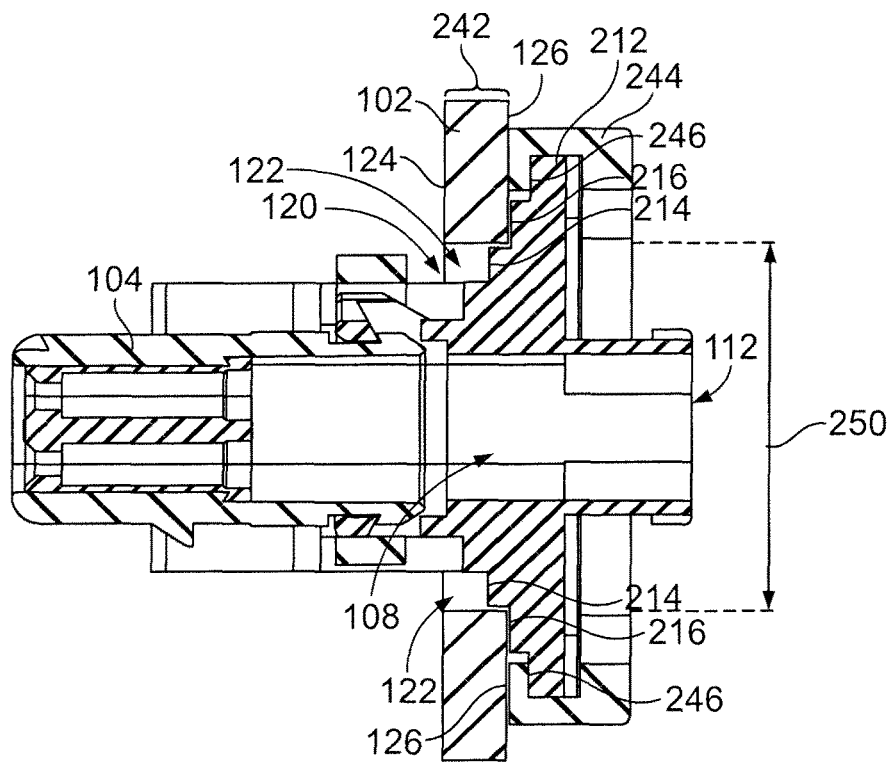

FIGS. 8A and 8B are side cross-sectional views of the header connector 100 shown in FIGS. 5-7 mounted to panels 102 of two different thicknesses. The stop feature 118 is the stepped flange 212 that extends upward from the top side 220 of the housing 104 and downward from the bottom side 222 of the housing 104. Since the cross-sections are side views, the latches 202, 206 (shown in FIG. 5) that extend from the left and right sides 204, 208, (FIG. 5) respectively, of the housing 104 are not shown. Although not shown, the free ends 134 (FIG. 5) of the latches 202, 206 are assumed to be in contact with or at least proximate to the front side 124 of the panels 102 in FIGS. 8A and 8B to retain the corresponding panels 102 in the respective panel mounting zones 120.

The header connector 100 in FIG. 8A is mounted to a panel 102 having a narrow thickness 240. Since the panel 102 is narrow, the rear side 126 of the panel 102 engages the first ledge 214 of the stepped flange 212 to retain the panel 102 in the panel mounting zone 120. The second ledge 216 that is stepped back from the first ledge 214 is spaced apart from and does not engage the rear side 126. Optionally, a gasket 244 may be placed around the stepped flange 212 to seal the header connector 100 to the panel 102, such as to prevent or at least prohibit contaminants and/or electromagnetic interference (EMI) from penetrating the panel 102 through the opening 122.

The header connector 100 in FIG. 8B is mounted to a panel 102 having a wide thickness 242. Since the panel 102 is wide, the rear side 126 of the panel 102 engages the second ledge 216 of the stepped flange 212 to retain the panel 102 in the panel mounting zone 120. The first ledge 214 is disposed within the opening 122 of the panel 102 and does not engage the rear side 126 of the panel 102. In an embodiment, the panels 102 shown in FIGS. 8A and 8B engage different ledges 214, 216 of the stepped flange 212 because the openings 122 have different dimensions. For example, the opening 122 of the narrow panel 102 shown in FIG. 8A has a height 248 that is smaller or shorter than a height 250 of the opening 122 of the wide panel 102 shown in FIG. 8B. Therefore, since the locations of the free ends 134 (shown in FIG. 8) of the latches 202, 206 (FIG. 8) are constant or fixed (relative to the rear end 112), panels 102 of different thicknesses are received in the panel mounting zone 120 by engaging different ledges 214, 216 of the stepped flange 212. Since the ledges 214, 216 are stepped from each other at different distances from the cavity 108 of the housing 104, the dimensions (for example, height) of the openings 122 in the panels 102 may be determined based on the thickness of the panel 102 to allow the panel 102 to align with an appropriate one of the ledges 214, 216.

The first and second ledges 214, 216 may each be configured to accommodate a range of panel thicknesses, with the thicknesses of the range accommodated by the second ledge 216 being greater or wider than the thicknesses of the range accommodated by the first ledge 214. In the illustrated embodiment, the stepped flange 212 further includes a third ledge 246 that is stepped from the second ledge 216 and disposed more proximate to the rear end 112 of the housing 104 than the second ledge 216. The third ledge 246 is also a farther distance from the cavity 108 than the second ledge 216. The third ledge 246 is configured to engage the rear side 126 of the panel 102 if the panel 102 has an extra wide thickness (for example, wider than the range of panel thicknesses accommodated by the second ledge 216). For the panel 102 to engage the third ledge 246, the opening 122 must be cut large enough such that both the first and second ledges 214, 216 are disposed within the opening 122. The third ledge 246 may be used to engage the gasket 244 when the panel 102 is narrow enough that the first ledge 214 or the second ledge 216 defines the panel mounting zone 120. Alternatively, the stepped flange 212 may include more than three ledges or less than three ledges.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

What is claimed is:

1. A panel-mountable header connector comprising:
   conductors configured to transmit at least one of electrical signals or optical signals; and
   a housing holding the conductors in a cavity of the housing, the housing having a front end and a rear end, the housing having a latch set and a stop feature extending from an outer surface of the housing, the latch set including at least one latch cantilevered to extend from a fixed end that is secured to the outer surface to a free end that is not secured to the outer surface, the latch set and the stop feature defining a panel mounting zone between the free end of the at least one latch and the stop feature, the free end of the at least one latch disposed between the panel mounting zone and the fixed end of the at least one latch, the panel mounting zone configured to align with an opening in a panel when the housing is mounted to the panel, the free end of the at least one latch of the latch set engaging a front side of the panel and the stop feature engaging a rear side of the panel to retain the panel in the panel mounting zone, at least one of the latch set or the stop feature being stepped such that a width of the panel mounting zone is variable to accommodate the panel having one of multiple thicknesses.

2. The header connector of claim 1, wherein the at least one latch of the latch set includes multiple latches comprising at least one wide panel latch and at least one narrow panel latch, the latch set being stepped such that the free end of the at least one narrow panel latch is disposed more proximate to the rear end of the housing than the free end of the at least one wide panel latch, the free end of the at least one narrow panel latch or the free end of the at least one wide panel latch being engaging the front side of the panel.

3. The header connector of claim 2, wherein the housing is configured to be mounted to the panel by inserting the housing front end first through the opening in a loading direction from the rear side of the panel to the front side of the panel, the latches configured to deflect inwards towards the cavity as the latches are inserted through the opening,
   wherein, if the panel has a wide thickness, when the panel mounting zone is aligned with the opening of the panel, the at least one wide panel latch is configured to undeflect and the free end thereof engages the front side of the panel, and the at least one narrow panel latch is configured to remain deflected such that the free end thereof does not engage the front side of the panel.

4. The header connector of claim 2, wherein the housing is configured to be mounted to the panel by inserting the housing front end first through the opening in a loading direction from the rear side of the panel to the front side of the panel, the latches configured to deflect inwards towards the cavity as the latches are inserted through the opening,
   wherein, if the panel has a narrow thickness, when the panel mounting zone is aligned with the opening of the panel, the at least one narrow panel latch is configured to undeflect and the free end thereof engages the front side of the panel, and the at least one wide panel latch is configured to undeflect such that the free end thereof is spaced apart from and does not engage the front side of the panel.

5. The header connector of claim 1, wherein the stop feature is at least one lug.

6. The header connector of claim 1, wherein the stop feature includes a stepped flange having at least a first ledge and a second ledge stepped from the first ledge such that the second ledge is disposed more proximate to the rear end of the housing than the first ledge, the first ledge or the second ledge being configured to engage the rear side of the panel.

7. The header connector of claim 6, wherein the latch set includes at least a first latch extending from a left side of the housing and a second latch extending from a right side of the housing, free ends of the first and second latches disposed an equal distance from the rear end of the housing and configured to engage the front side of the panel, the stepped flange extending from a top side of the housing and a bottom side of the housing.

8. The header connector of claim 1, wherein the housing further includes a ramp that escalates gradually from the outer surface of the housing from a base of the ramp to an apex of the ramp that is escalated from the outer surface, the base of the ramp disposed in the panel mounting zone and the apex disposed outside of the panel mounting zone, a portion of the ramp between the base and the apex engaging a rear edge of the opening of the panel in the panel mounting zone to apply a biasing force on the panel towards the free end of the at least one latch of the latch set that engages the front side of the panel.

9. A panel-mountable header connector comprising:
   conductors configured to transmit at least one of electrical signals or optical signals; and
   a housing holding the conductors in a cavity of the housing, the housing having a front end and a rear end, the housing defining a panel mounting zone configured to align with an opening in a panel when the housing is mounted to the panel, the housing having multiple latches including at least one wide panel latch and at least one narrow panel latch, the latches extending from an outer surface of the housing between the panel mounting zone and the front end of the housing, a free end of the at least one narrow panel latch being disposed more proximate to the rear end of the housing than a free end of the at least one wide panel latch;
   wherein, based on a thickness of the panel, the free end of the at least one narrow panel latch or the free end of the at least one wide panel latch is configured to engage a front side of the panel to retain the panel in the panel mounting zone.

10. The header connector of claim 9, wherein the housing is configured to be mounted to the panel by inserting the housing front end first through the opening in a loading direction from a rear side of the panel to the front side of the panel, the latches configured to deflect inwards towards the cavity as the latches are inserted through the opening, the at least one wide panel latch undeflecting as the free end thereof moves past the front side of the panel.

11. The header connector of claim 10, wherein, if the panel has a wide thickness, the at least one narrow panel latch remains deflected such that the free end thereof does not engage the front side of the panel, and the free end of the at least one wide panel latch that is undeflected engages the front side of the panel.

12. The header connector of claim 10, wherein, if the panel has a narrow thickness, the at least one narrow panel latch undeflect as the free end thereof moves past the front side of the panel, the free end of the at least one narrow panel configured to engage the front side of the panel, the free end of the at least one wide panel latch that is undeflected is spaced apart from and does not engage the front side of the panel.

13. The header connector of claim 9, wherein the housing further includes a stop feature protruding from the outer surface more proximate to the rear end of the housing than the latches, the panel mounting zone being defined between the free ends of the latches and the stop feature, the stop feature configured to engage a rear side of the panel to retain the panel in the panel mounting zone.

14. The header connector of claim 13, wherein the stop feature is a flange, the flange including biasing segments at corners of the flange, the biasing segments including apertures rearward of a front wall of the flange, the biasing segments configured to engage the rear side of the panel and to deflect at least partially into the at least one aperture to apply a biasing force on the panel towards the latches.

15. The header connector of claim 9, wherein the housing further includes a ramp that escalates gradually from the outer surface of the housing in the panel mounting zone towards the rear end of the housing, the ramp being at least partially deflectable, the ramp configured to engage a rear edge of the opening of the panel to apply a biasing force on the panel towards the latches.

16. The header connector of claim 9, wherein the latches are disposed on a first side of the housing, the housing further including a shelf extending from an opposite second side of the housing, the shelf configured to hook around the opening of the panel as the housing is inserted into the opening to allow the housing to pivot about the shelf.

17. A panel-mountable header connector comprising:
conductors configured to transmit at least one of electrical signals or optical signals; and
a housing holding the conductors in a cavity of the housing, the housing extending a length between a front end and a rear end, the housing defining a panel mounting zone along the length that is configured to align with an opening in a panel when the housing is mounted to the panel, the housing having a stepped flange disposed between the panel mounting zone and the rear end of the housing along the length of the housing, the stepped flange including at least a first ledge that extends outward from an outer surface of the housing and a second ledge stepped from the first ledge such that the second ledge extends outward from the first ledge, the second ledge stepped from the first ledge along the length of the housing such that the second ledge is disposed more proximate to the rear end of the housing than the first ledge;
wherein, based on a thickness of the panel, the first ledge or the second ledge is configured to engage a rear side of the panel to retain the panel in the panel mounting zone.

18. The header connector of claim 17, wherein if the panel has a narrow thickness, the first ledge is configured to engage the rear side of the panel and the second ledge is spaced apart from and does not engage the rear side, and, if the panel has a wide thickness, the second ledge is configured to engage the rear side of the panel and the first ledge is disposed within the opening of the panel.

19. The header connector of claim 17, wherein the housing includes at least a first latch extending from a left side of the housing and a second latch extending from a right side of the housing, free ends of the first and second latches disposed an equal distance from the rear end of the housing and configured to engage a front side of the panel to retain the panel in the panel mounting zone, the stepped flange extending from a top side of the housing and a bottom side of the housing.

20. The header connector of claim 17, wherein the stepped flange includes a third ledge that is disposed more proximate to the rear end of the housing than the second ledge, the third ledge configured to engage the rear side of the panel and the first and second ledges are disposed within the opening of the panel if the panel has an extra wide thickness.

* * * * *